(12) United States Patent
Jing et al.

(10) Patent No.: US 7,140,413 B2
(45) Date of Patent: Nov. 28, 2006

(54) METHOD OF MODIFYING A FLUOROPOLYMER AND ARTICLES THEREBY

(75) Inventors: Naiyong Jing, Woodbury, MN (US); Gerald Rainer Adalbert Hofmann, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/248,806

(22) Filed: Oct. 12, 2005

(65) Prior Publication Data

US 2006/0029812 A1 Feb. 9, 2006

Related U.S. Application Data

(62) Division of application No. 10/681,909, filed on Oct. 9, 2003, now Pat. No. 6,986,947.

(51) Int. Cl.
  *C25D 11/00* (2006.01)
(52) U.S. Cl. .................. 156/349; 156/329; 428/421; 428/423.1; 428/422; 526/250; 525/339; 525/340; 525/333.9; 528/481
(58) Field of Classification Search ............... 428/422, 428/421, 423.1; 526/250; 525/339, 333.9; 528/481; 156/349, 329
See application file for complete search history.

(56) References Cited

U.S. PATENT DOCUMENTS

| | | | |
|---|---|---|---|
| 3,376,278 A | 4/1968 | Morgan et al. | |
| 4,164,463 A | 8/1979 | Fang | |
| 4,186,084 A * | 1/1980 | Fang ..................... | 210/652 |
| 4,192,764 A | 3/1980 | Madsen | |
| 4,233,421 A | 11/1980 | Worm | |
| 4,261,800 A | 4/1981 | Beckenbaugh et al. | |
| 4,338,237 A | 7/1982 | Sulzbach et al. | |
| 4,567,241 A | 1/1986 | Kitchens et al. | |
| 4,613,653 A | 9/1986 | Kitchens et al. | |
| 4,775,449 A | 10/1988 | Dumas et al. | |
| 4,824,692 A | 4/1989 | Gillick et al. | |
| 4,912,171 A | 3/1990 | Grootaert et al. | |
| 5,051,312 A | 9/1991 | Allmer | |
| 5,075,427 A | 12/1991 | Kang et al. | |
| 5,086,123 A | 2/1992 | Guenthner et al. | |
| 5,262,490 A | 11/1993 | Kolb et al. | |
| 5,284,611 A | 2/1994 | Grootaert et al. | |
| 5,285,002 A | 2/1994 | Grootaert | |
| 5,320,789 A | 6/1994 | Nishii et al. | |
| 5,358,775 A | 10/1994 | Horn, III | |
| 5,419,968 A | 5/1995 | Okada et al. | |
| 5,470,617 A | 11/1995 | Nishii et al. | |
| 5,478,652 A | 12/1995 | Grootaert et al. | |
| 5,580,616 A | 12/1996 | Niino et al. | |
| 5,656,121 A | 8/1997 | Fukushi | |

(Continued)

FOREIGN PATENT DOCUMENTS

EP   0 769 517 A1   4/1997

(Continued)

OTHER PUBLICATIONS

Allmer et al., "Photochemical Modification of a Fluoropolymer Surface", Macromolecules, 1991, 24, pp. 5487-5488.

(Continued)

*Primary Examiner*—David W. Wu
*Assistant Examiner*—Henry S. Hu

(57) ABSTRACT

A fluoropolymer is modified by contacting it with a modifying composition preparable from components comprising a phase transfer catalyst and at least one of a sulfide or disulfide salt, and heating the modifying composition. The modified fluoropolymer is useful in the preparation of composite articles.

24 Claims, 1 Drawing Sheet

U.S. PATENT DOCUMENTS

| | | | |
|---|---|---|---|
| 5,658,671 | A | 8/1997 | Fukushi |
| 5,734,085 | A | 3/1998 | Coggio et al. |
| 5,859,086 | A | 1/1999 | Freund et al. |
| 5,882,466 | A | 3/1999 | Grootaert et al. |
| 6,080,487 | A * | 6/2000 | Coggio et al. ............... 428/422 |
| 6,117,497 | A | 9/2000 | Murahara et al. |
| 6,156,400 | A | 12/2000 | Jing et al. |
| 6,197,383 | B1 | 3/2001 | Nigam |
| 6,242,548 | B1 | 6/2001 | Duchesne et al. |
| 6,255,384 | B1 | 7/2001 | McCarthy et al. |
| 6,451,925 | B1 * | 9/2002 | Jing ........................... 525/340 |
| 6,630,047 | B1 | 10/2003 | Jing et al. |
| 6,649,005 | B1 | 11/2003 | Jing et al. |
| 2002/0197481 | A1 | 12/2002 | Jing et al. |
| 2003/0077454 | A1 | 4/2003 | Jing |
| 2003/0159915 | A1 | 8/2003 | Jing et al. |
| 2003/0162022 | A1 | 8/2003 | Jing et al. |
| 2003/0198770 | A1 | 10/2003 | Fukushi et al. |
| 2003/0198771 | A1 | 10/2003 | Fukushi et al. |
| 2004/0002012 | A1 * | 1/2004 | Pavlisko et al. .............. 430/45 |
| 2005/0080212 | A1 | 4/2005 | Jing et al. |
| 2005/0084683 | A1 * | 4/2005 | Wynne ....................... 428/421 |

FOREIGN PATENT DOCUMENTS

| | | |
|---|---|---|
| WO | WO 96/05965 A1 | 2/1996 |
| WO | WO 01/89827 A1 | 11/2001 |
| WO | WO 02/087551 A1 | 11/2002 |
| WO | WO 02/092722 A1 | 11/2002 |

OTHER PUBLICATIONS

Barker et al.,"The Electrochemical Reduction of Polytetrafluoroethylene," Electrochimica Acta, 1978, vol. 23, pp. 1107-1110.

Brewis et al., "Reactions of Polytetrafluoroethylene with Electrochemically Generated Intermediates", Die Angewandte Makromolekulare Chemie, 43, 1975, pp. 191-194 (Nr. 659).

Brewis, "Surface Analysis and Pretreatment of Plastics and Metals", Applied Science Publishers, NY, 1982, pp. 1-11.

Burdeniuc et al., "Mineralization of Chlorofluorocarbons and Aromatization of Saturated Fluorocarbons by a Convenient Thermal Process", Science, vol. 271, Jan. 19, 1996, pp. 340-341.

Burdeniuc et al., "New Reaction of Saturated Fluorocarbons: Partial Reduction by NH3 with Hg Photosensitization", J. Am. Chem. Soc., 1995, 117, pp. 10119-10120.

Burggraaf, "Pick Your Plastic Pipe Carefully—Chemicals, even water, can degrade some plastics", Semiconductor International, Jul. 1988, pp. 54-58.

Clark et al., "Surface Modification by Plasma Techniques. I. The Interactions of a Hydrogen Plasma with Fluoropolymer Surfaces", Journal Polym. Sci., Polym. Chem. Ed., 1987, vol. 25, pp. 2643-2664.

Cooper et al., "Theoretical Studies of Fluorocarbons—Part III. Primary, Secondary, Tertiary and Quaternary Centres", Journal of Fluorine Chemistry, 49, 1990, pp. 421-432.

Kaprinidis et al., "Photosensitized Defluorination of Saturated Perfluorocarbons", Pergamon, Tetrahedron Letters, vol. 37, No. 14, pp. 2373-2376, 1996.

MacNicol et al., "New and unexpected reactivity of saturated fluorocarbons", Letters to Nature, Nature, vol. 332, Mar. 3, 1988, pp. 59-61.

Marsella et al., "Selective Reduction of Saturated Perfluorocarbons", J. Org. Chem., 1992, 57, pp. 2856-2860.

Niino et al., "Surface modification and metallization of fluorocarbon polymers by excimer laser processing", Appl. Phys. Lett., 63, (25), Dec. 20, 1993, pp. 3527-3529.

Révész et al., "Excimer laser induced surface chemical modification of polytetrafluoroethylene", Elsevier, Applied Surface Science 109/110, 1997, pp. 222-226.

Rye et al., "Depth Dependence of Alkali Etching of Poly(tetrafluoroethylene): Effect of X-ray Radiation", Langmuir 1989, 5, pp. 1331-1334.

Siperko et al., "Chemical and physical modification of fluoropolymer surfaces for adhesion enhancement: a review", J. Adhesion Sci. Technol., 1989 vol. 3, No. 3, pp. 157-173.

Briggs et al., "Electrical Discharge Treatment of Polypropylene Film", Polymer, 1983, vol. 24 pp. 47-52.

Gagnon et al., "Polymer Surface Reconstruction by Diffusion of Organic Functional Groups From and to the Surface", J. Appl., Polym. Sci., 1984, vol. 29, pp. 4335-4340.

Yamamoto et al., "Surface Grafting of Polyethylene by Mutual Irradiation in Methyl Acrylate Vapor. III. Quantitative Surface Analysis by X-Ray Photoelectron Spectroscopy", J. Polym. Sci., Polym. Phys. Ed., 1979, vol. 17, pp. 1581-1590.

Kise, et al., "Phase Transfer Catalysis in Dehydrofluorination of Poly (vinylidene Fluoride) by Aqueous Sodium Hydroxide Solutions", J. Polym. Sci. Poly. Chem. Ed., 1983, vol. 21, pp. 3443-3451.

Dias et al., Synthesis of a Two-Dimensional Array of Organic Functional Groups: Surface-Selective Modifiocation of Poly(vinylidene fluoride), Macromolecules, 1984, 17, pp. 2529-2531.

Kise, et al., "Dehydrochlorination of Poly (vinyl Chloride) by Aqueous Sodium Hydroxide Solution Under Two-Phase Conditions", J. Poly. Sci. Poly. Chem. Ed., 1982, vol. 20, pp. 3189-3197.

Yoshino et al., "Conducting Polymer Prepared from Teflon", Japanese Journal of Applied Physics, 1982, vol. 21, No. 5, pp. 301-302.

ASTM D 1876-01 Standard Test Method for Peel Resistance of Adhesives (T-Peel Test), 2001, pp. 1-3.

Sherman, "NPE News Wrap-Up: Engineering Thermoplastics", Plastics Technology Online, Aug. 2000, [retrieved from the internet on Sep. 23, 2003], <www.plasticstechnology.com>, pp. 1-7.

* cited by examiner

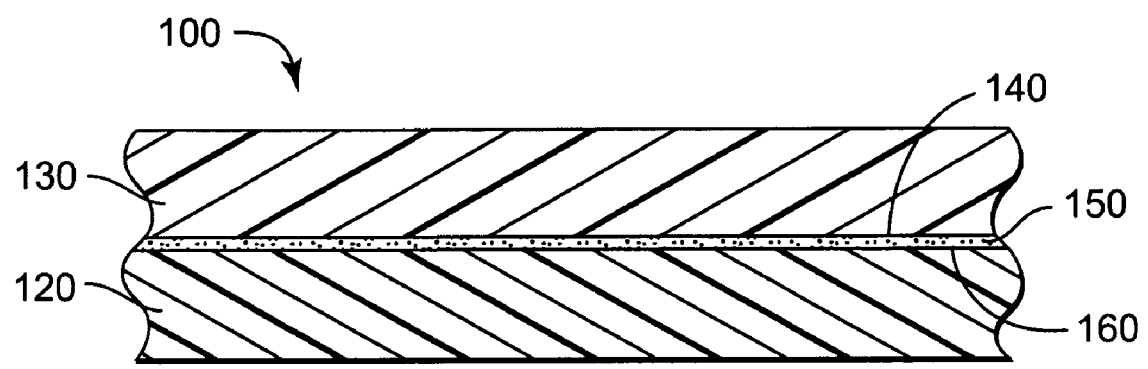

METHOD OF MODIFYING A FLUOROPOLYMER AND ARTICLES THEREBY

CROSS-REFERENCE TO RELATED APPLICATION

This application is a divisional of U.S. application Ser. No. 10/681,909, filed Oct. 9, 2003 now Pat. No. 6,986,947, the disclosure of which is herein incorporated by reference.

BACKGROUND

Fluoropolymers are generally renowned for their chemical and physical inertness. Indeed, their excellent barrier properties and hydrophobic character are extensively exploited for applications such as moisture and noxious gas barriers, anti-corrosion and non-stick coatings. Examples of commonly used fluoropolymers include polytetrafluoroethylene, polyvinylidene difluoride, and copolymers of vinylidene difluoride with tetrafluoroethylene and hexafluoropropylene.

Multi-layer constructions containing fluoropolymers enjoy wide industrial application. Such constructions find utility, for example, in fuel line hoses and related containers and hoses or gaskets in the chemical processing field. Adhesion between the layers of a multi-layered article may need to meet various performance standards depending on the use of the finished article. However, in bonding applications between a fluoropolymer film and a non-fluorinated polymer film, the non-adhesive qualities of fluoropolymers can make it difficult to obtain a strong laminated bond.

Various approaches have been used to modify the surface of fluoropolymer substrates, including harsh chemical treatments such as alkali metal reduction (e.g., using alkali metal in liquid ammonia or sodium-naphthalene in glyme), and in the case of polyvinylidene difluoride, using concentrated alkali metal hydroxide solutions in the presence of a phase transfer catalyst. Other approaches include radiation treatments such as laser induced surface modification, and photoreduction of fluoropolymer substrates.

Each of the above processes has drawbacks. For example, alkali metal reduction requires maintenance of moisture-free conditions, the concentrated (8 N) alkali metal hydroxide process is relatively slow, and radiation induced processes require a radiation source that may be costly (e.g., a laser), and/or may not be well-suited to opaque substrates (e.g., photochemical reduction in the presence of electron donors).

It would be desirable to have new methods for chemically modifying fluoropolymers. It would also be useful to have new methods for chemically modifying surfaces of fluoropolymer substrates so that they can be bonded to non-fluorinated polymeric substrates, particularly if such methods are easily and quickly carried out and result in strong laminated bonds.

SUMMARY

In one aspect, the present invention provides a method of modifying a fluoropolymer comprising:

contacting the fluoropolymer with a modifying composition preparable from components comprising a phase transfer catalyst, at least one of a sulfide or polysulfide salt or anionic conjugate acid thereof, and a liquid vehicle; and heating the modifying composition at a temperature of at least about 40 degrees Celsius while in contact with the fluoropolymer, wherein the fluoropolymer has a backbone comprising subunits having the structure —$CH_2CFX$—, wherein X represents H, Cl, or F.

In another aspect, the present invention provides method of preparing a composite article comprising:

providing a first substrate having a surface comprising fluoropolymer;

contacting the surface of the first substrate with a modifying composition preparable from components comprising a phase transfer catalyst, at least one of a sulfide or polysulfide salt or anionic conjugate acid thereof, and a liquid vehicle, wherein the fluoropolymer has a backbone comprising subunits having the structure —$CH_2CFX$—, wherein X represents H, Cl, or F; and bonding the first substrate to a second substrate to provide a composite article, wherein the method is carried out in the substantial absence of actinic radiation.

In some embodiments, the fluoropolymer backbone further comprises monomeric units having at least one of the formulas —$CF_2CF_2$—, —$CH_2CH_2$—, —$CF_2CF(CF_3)$—, or —$CH_2CH(CH_3)$—.

In yet another aspect, a first substrate has a surface that comprises modified fluoropolymer according to the present invention. In some embodiments, the surface of the first substrate may be bonded to a second substrate to form a composite article.

These and other aspects of the invention will be apparent from the detailed description below. In no event, however, should the above summaries be construed as limitations on the claimed subject matter, which subject matter is defined solely by the attached claims, as may be amended during prosecution.

As used in this application:

"fluoropolymer" means a polymer having fluorine atoms on its backbone and a fluorine content of at least 20 percent by weight;

"monomer" means a compound that can undergo polymerization thereby contributing constitutional units to the essential structure of a polymer;

"monomeric unit" means the largest constitutional unit contributed by a single monomer molecule to the structure of a polymer;

"polymer" means a chemical compound comprising at least five monomeric units, which monomeric units may be the same or different;

"polymer backbone" means the longest chain of connected monomeric units in a polymer;

"soluble" means dissolvable in a chosen liquid vehicle at concentrations exceeding about 0.001 mole per liter at 25° C.; and "subunit" means a divalent group that is contained within a polymer backbone.

BRIEF DESCRIPTION OF THE DRAWING

The drawing is a cross-sectional side view of an exemplary composite article according to the present invention.

DETAILED DESCRIPTION

Useful fluoropolymers have a backbone comprising one or more subunits having the structure —$CH_2CFX$—, wherein X represents H, Cl, or F. The subunits may, or may not, correspond to monomeric units.

Useful fluoropolymers include, for example, polyvinyl fluoride, polyvinylidene difluoride, and copolymers of vinyl fluoride, chlorotrifluoroethylene, and/or vinylidene difluoride (i.e., VDF) with one or more ethylenically unsaturated monomers such as alkenes (e.g., ethylene, propylene, butylene, and 1-octene), chloroalkenes (e.g., vinyl chloride and tetrachloroethylene), chlorofluoroalkenes (e.g., chlorotrifluoroethylene, 3-chloropentafluoropropene, dichlorodifluoroethylene, and 1,1-dichlorofluoroethylene), fluoroalkenes (e.g., trifluoroethylene, tetrafluoroethylene (i.e., TFE), 1-hydropentafluoropropene, 2-hydropentafluoropropene, hexafluoropropylene (i.e. HFP), and vinyl fluoride), perfluoroalkoxy vinyl ethers (e.g., $CF_3OCF_2CF_2CF_2OCF=CF_2$); perfluoroalkyl vinyl ethers (e.g., $CF_3OCF=CF_2$ and $CF_3CF_2CF_2OCF=CF_2$), perfluoro-1,3 -dioxoles such as those described in U.S. Pat. No. 4,558,142 (Squire), fluorinated diolefins (e.g., perfluorodiallyl ether or perfluoro-1,3-butadiene), and combinations thereof.

Commercially available vinyl fluoride fluoropolymers include, for example, those marketed under the trade designation "TEDLAR" by E.I. du Pont de Nemours & Company, Wilmington, Del.

Commercially available vinylidene difluoride-containing fluoropolymers include, for example, those fluoropolymers having the trade designation "THV" (e.g., "THV 200", "THV 400", "THVG", "THV 610", or "THV 800") as marketed by Dyneon, St. Paul, Minn.; "KYNAR" (e.g., "KYNAR 740") as marketed by Atofina, Philadelphia, Pa.; "HYLAR" (e.g., "HYLAR 700") as marketed by Ausimont USA, Morristown, N.J.; and "FLUOREL" (e.g., "FLUOREL FC-2178") as marketed by Dyneon.

The fluoropolymer may be melt-processable, for example, as in the case of polyvinylidene difluoride; copolymers of tetrafluoroethylene, hexafluoropropylene, and vinylidene difluoride (e.g., those marketed by Dyneon LLC under the trade designation "THV"); copolymers of tetrafluoroethylene and hexafluoropropylene; and other melt-processable fluoroplastics; or the fluoropolymer may not be melt-processable, for example, as in the case of polytetrafluoroethylene, copolymers of TFE and low levels of fluorinated vinyl ethers), and cured fluoroelastomers.

One useful fluoropolymer includes monomeric units derived from at least TFE and VDF in which the amount of VDF is at least 0.1, 3, or 10 percent by weight, but less than 15 or 20 percent by weight, with the remainder being TFE derived monomeric units.

Useful fluoropolymers include those copolymers having HFP and VDF monomeric units, for example, those copolymers in which the amount of VDF monomeric units is at least 0.1, 3, or 10 percent by weight, but less than 15 or 20 percent by weight, with the remainder of the polymer weight being HFP monomeric units.

Useful fluoropolymers also include copolymers of HFP, TFE, and VDF (i.e., THV). These polymers may have, for example, VDF monomeric units in a range of from at least about 2, 10, or 20 percent by weight up to 30, 40, or even 50 percent by weight, and HFP monomeric units in a range of from at least about 5, 10, or 15 percent by weight up to about 20, 25, or even 30 percent by weight, with the remainder of the weight of the polymer being TFE monomeric units. Examples of commercially available THV polymers include those marketed by Dyneon, LLC under the trade designations "DYNEON THV 2030G FLUOROTHERMOPLASTIC", "DYNEON THV 220 FLUOROTHERMOPLASTIC", "DYNEON THV 340C FLUOROTHERMOPLASTIC", "DYNEON THV 415 FLUOROTHERMOPLASTIC", "DYNEON THV 500A FLUOROTHERMOPLASTIC", "DYNEON THV 610G FLUOROTHERMOPLASTIC", or "DYNEON THV 810G FLUOROTHERMOPLASTIC".

Useful fluoropolymers also include copolymers of ethylene, TFE, and HFP. These polymers may have, for example, ethylene monomeric units in a range of from at least about 2, 10, or 20 percent by weight up to 30, 40, or even 50 percent by weight, and HFP monomeric units in a range of from at least about 5, 10, or 15 percent by weight up to about 20, 25, or even 30 percent by weight, with the remainder of the weight of the polymer being TFE monomeric units. Such polymers are marketed, for example, under the trade designation "DYNEON FLUOROTHERMOPLASTIC HTE" (e.g., "DYNEON FLUOROTHERMOPLASTIC HTE X 1510" or "DYNEON FLUOROTHERMOPLASTIC HTE X 1705") by Dyneon LLC.

Useful fluoropolymers also include copolymers of tetrafluoroethylene and propylene (TFE/P). These copolymers may have, for example, TFE monomeric units in a range of from at least about 20, 30 or 40 percent by weight up to about 50, 65, or even 80 percent by weight, with the remainder of the weight of the polymer being propylene monomeric units. Such polymers are commercially available, for example, under the trade designations "AFLAS" (e.g., "AFLAS TFE ELASTOMER FA 100H", "AFLAS TFE ELASTOMER FA 150C", "AFLAS TFE ELASTOMER FA 150L", or "AFLAS TFE ELASTOMER FA 150P") as marketed by Dyneon, LLC, or "VITON" (e.g., "VITON VTR-7480" or "VITON VTR-7512") as marketed by E.I. du Pont de Nemours & Company, Wilmington, Del.

Useful fluoropolymers also include copolymers of ethylene and TFE (i.e., "ETFE"). These copolymers may have, for example, TFE monomeric units in a range of from at least about 20, 30 or 40 percent by weight up to about 50, 65, or even 80 percent by weight, with the remainder of the weight of the polymer being propylene monomeric units. Such polymers may be obtained commercially, for example, as marketed under the trade designations "DYNEON FLUOROTHERMOPLASTIC ET 6210J", "DYNEON FLUOROTHERMOPLASTIC ET 6235", or "DYNEON FLUOROTHERMOPLASTIC ET 6240J" by Dyneon LLC.

VDF-containing fluoropolymers can be prepared using emulsion polymerization techniques as described, for example, in U.S. Pat. No. 4,338,237 (Sulzbach et al.) or U.S. Pat. No. 5,285,002 (Grootaert), the disclosures of which are incorporated herein by reference.

The fluoropolymer may have any form. For example, the fluoropolymer may comprise a solution or dispersion, or it may have a solid form such as, for example, a block, film (e.g., including sheets, webs, and tapes), or a molded article. In the case of solid forms, methods according to the present invention are useful for modifying one or more surfaces of the solid form (e.g., one or more major surfaces of a film), while in the case of emulsions or solutions, methods of the present invention are useful for modifying the bulk polymer.

The fluoropolymer is modified by contacting it with a modifying composition that comprises and/or is preparable from a phase transfer catalyst, at least one of a sulfide or polysulfide salt or an anionic conjugate acid thereof, and heating the contacted combination at a temperature at or above ambient temperature (e.g., 23° C.). Typically, heating at a temperature of at least 40° C. results in useful rates of modification, with even more rapid rates resulting at higher temperatures such as, for example, at least 60° C. or even at least 80° C. The duration of heating may be for as little as at least 1, 15, 30 or 60 seconds up to and including 120 or even 300 seconds, although longer and shorter durations may also be useful depending on specific conditions and the degree of modification sought. He ating may be provided by ambient conditions or conventional means such as, for example, ovens (e.g., convection or forced air), radiant heaters, hot plates, microwave heaters, heated vessels, heated rollers, and combinations thereof.

Advantageously, methods according to the present invention do not require light in order to be effective, which makes them useful in applications where it is difficult to use light (e.g., closed metal reaction vessels) or where exposure to light is undesirable (e.g., light degradable materials). Thus, methods according to the present invention may be carried out in the substantial absence of actinic radiation (i.e., in the absence of actinic radiation other than that adventitious actinic radiation caused by ambient lighting conditions such as, for example, sunlight, candles, lamps, lanterns, and/or incandescent or fluorescent room lighting). As used herein "actinic radiation" means light having a wavelength of from at least 200 nanometers up to and including 400 nanometers.

Useful phase transfer catalysts include, for example, organosulfonium salts (e.g., triarylsulfonium salts such as triphenylsulfonium chloride, trichlorophenylsufonium bromide, tritolylsulfonium chloride, and diphenyl-(4-thiophenyl)phenylsulfonium hexafluorophosphate; trialkylsulfonium salts such as tributylsulfonium chloride, ethyldibutylsulfonium bromide; mixed alkylarylsulfonium salts such as methyldiphenylsulfonium p-toluenesulfonate, ethyloctylphenylsulfonium chloride, butyldiphenylsulfonium hexafluorophosphate; and combinations and substituted derivatives of the foregoing); organoarsonium salts (e.g., tetraarylarsonium salts such as tetraphenylarsonium chloride and tetatolylarsonium bromide; tetraalkylarsonium salts such as tetramethylarsonium iodide, octyltrimethylarsonium bromide, and tetraethylarsonium chloride; mixed alkylarylarsonium salts such as butyltriphenylarsonium iodide; and combinations and substituted derivatives of the foregoing); organoantimonium salts (e.g., tetraarylantimonium salts such as tetraphenylantimonium chloride and tritolylantimonium chloride; tetraalkylantimonium salts such as tetramethylantimonium iodide, octyltrimethylantimonium bromide, and tetraethylantimonium chloride; mixed alkylarylantimonium salts such as butyldiphenylantimonium iodide; and combinations and substituted derivatives of the foregoing); organoiodonium salts (e.g., diaryliodonium salts such as diphenyliodonium chloride, diphenyliodonium hexafluoroantimonate, and ditolyliodonium chloride); organophosphonium salts (e.g., quaternary phosphonium salts such as tetraalkylphosphonium salts, aralkyltriarylphosphonium salts, and aryltrialkylphosphonium salts); organoammonium salts (e.g., quaternary ammonium salts such as tetraalkylammonium salts, aralkyltriarylammonium salts, and aryltrialkylammonium salts); crown ethers; and combinations of thereof.

Further details concerning phase transfer catalysts may be found in, for example, U.S. Pat. No. 4,233,421 (Worm), U.S. Pat. No. 4,912,171 (Grootaert et al.), U.S. Pat. No. 5,086,123 (Guenthner et al.) and U.S. Pat. No. 5,262,490 (Kolb et al.).

Phosphonium and ammonium salt phase transfer catalysts are typically relatively inexpensive and easily obtained, and therefore are typically well-suited for use in practice of the present invention. Useful tetraalkylphosphonium or tetraalkylammonium salts may have as few as 4 carbon atoms, up to at least 16, 20, 24 carbon atoms or even more.

Quaternary ammonium salts and quaternary phosphonium salts may have any suitable anionic counterion that permits at least partial solubility of the salt in the liquid vehicle. Examples of suitable counterions include halides (e.g., fluoride, chloride, bromide, iodide), nitrate, bisulfate, sulfate, carbonate, bicarbonate, phosphate, alkylphosphonate, mesylate, tosylate, and combinations thereof.

Examples of useful commercially available quaternary ammonium salts include methyltributylammonium chloride, methyltricaprylylammonium chloride, tetrabutylammonium bromide, tetrabutylammonium hydrogen sulfate, tetraethylammonium bromide, tetraethylammonium hydroxide, tetramethylammonium chloride, tetramethylammonium iodide, tributylethylammonium bromide, tributylmethylammonium chloride, triethylbutylammonium bromide, benzyltributylammonium chloride, benzyltriethylammonium chloride, benzyltrimethylammonium chloride, phenyltrimethylammonium chloride, tetraoctylammonium chloride, triphenylbenzylammonium bromide, triphenylbenzylammonium acetate, triphenylbenzylammonium benzoate, triphenylisobutylammonium bromide, trioctyl-n-butylammonium chloride, trioctylbenzylammonium chloride, trioctylbenzylammonium acetate, triphenyl-2,4-dichlorobenzylammonium chloride, trioctylmethoxyethoxyethylammonium chloride, triphenylethoxycarbonylmethylammonium chloride, triphenylallylammonium chloride, and 1-butylpyridinium chloride.

Examples of useful commercially available quaternary ammonium salts include benzyltriphenylphosphonium chloride, butyltriphenylphosphonium bromide, ethyltriphenylphosphonium bromide, ethyltriphenylphosphonium chloride, ethyltriphenylphosphonium iodide, methyltriphenylphosphonium bromide, methyltriphenylphosphonium chloride, methyltriphenylphosphonium iodide, tetrabutylphosphonium bromide, tetraphenylphosphonium bromide, tetraoctylphosphonium chloride, triphenylbenzylphosphonium bromide, triphenylbenzylphosphonium acetate, triphenylbenzylphosphonium benzoate, triphenylisobutylphosphonium bromide, trioctyl-n-butylphosphonium chloride, trioctylbenzylphosphonium chloride, trioctylbenzylphosphonium acetate, triphenyl-2,4-dichlorobenzylphosphonium chloride, trioctylmethoxyethoxyethylphosphonium chloride, triphenylethoxycarbonylmethylphosphonium chloride, and triphenylallylphosphonium chloride.

Useful crown ethers include macrocyclic polyethers comprising ethylene oxide units which can coordinate to a centrally located metal atom via the oxygen atoms of the ethers such as, for example, 18-crown-6 ether, 15-crown-5 ether, dicyclohexyl-18-crown-6 ether, and dibenzo-18-crown-6 ether, 12-crown-4 ether, 21-crown-7 ether, benzo-15-crown-5 ether, which may be readily obtained from commercial sources.

Typical concentrations of phase transfer catalysts in the modifying composition are in a range of from at least 0.001 up to 0.1 mole per liter, although other amounts may also be used.

Useful sulfide and polysulfide salts include those salts that have at least partial solubility in at least one liquid vehicle, and include, for example, salts comprising at least one sulfide or polysulfide (e.g., disulfide, trisulfide, or tetrasulfide) anion, or an anionic conjugate acid of sulfide or polysulfide (e.g., bisulfide), or a combination thereof, in combination with at least one cationic counterion. Useful cationic counterions include, for example, alkali metal ions (e.g., $Na^+$, $K^+$, $Li^+$, $Cs^+$), alkaline earth ions (e.g., $Mg^{2+}$, $Ca^{2+}$), $NH4+$, quaternary ammonium (e.g., tetraalkylammonium, aryltrialkylammonium, aralkyltrialkylammonium, tetraaryl ammonium) ions, and quaternary phosphonium (e.g., tetraalkylphosphonium, aryltrialkylphosphonium, aralkyltrialkylphosphonium, tetraarylphosphonium) ions, and combinations thereof. Typical concentrations of sulfide or polysulfide salt in the modifying composition are in a range of from at least 0.001 up to 0.1 mole per liter, although other amounts may also be used.

Sulfide ions may be provided by various precursors that form sulfide in the presence of water (e.g., in the presence of a base catalyst). Examples of such precursors include thioacids, thioureas, and thioketones.

In one useful embodiment, a sulfide or polysulfide anion, or anionic conjugate acid thereof may be paired with a cation of at least one of the phase transfer catalyst described above to form a salt. Such salts may simultaneously serve as a sulfide or polysulfide salts (or an anionic conjugate acid thereof) and a phase transfer catalyst.

Typically, the liquid vehicle should be chosen such that it does not dissolve or significantly swell the polymeric substrate, but is at least partially effective to dissolve the phase transfer catalyst and sulfide salt, polysulfide salt, or anionic conjugate acid thereof. The liquid vehicle may comprise water, organic solvent (e.g., alcohols such as methanol, ethanol, isopropanol; ketones and ketoalcohols such as acetone, methyl ethyl ketone, diacetone alcohol; esters such as ethyl acetate and ethyl lactate; polyhydric alcohols such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, and trimethylopropane ethoxylate; lower alkyl ethers, such as ethylene glycol monomethyl or monoethyl ether, diethylene glycol methyl or ethyl ether, and triethylene glycol monomethyl and monoethyl ether; and combinations thereof), or a combination thereof.

The modifying composition may include optional additives such as, for example, thixotropes, thickeners, gelation agents, latex particles, fibers, inorganic particles, an emulsifiable phase, woven or nonwoven materials, and/or nucleophiles (i.e., species that have a preferential attraction to regions of low electron density) that may become grafted to the fluoropolymer. Exemplary nucleophiles include water, hydroxide, alcohols, alkoxides, cyanide, cyanate, halide (e.g., chloride, bromide, iodide).

Typically, the modifying composition may be prepared by combining (e.g., with mixing) the phase transfer catalyst, sulfide or polysulfide salt or an anionic conjugate acid thereof, liquid vehicle, and optional additives. In some cases, heating may be useful to facilitate dissolving one or more of the components in the liquid vehicle.

Varying degrees of surface modification may be obtained, for example, by varying the length of time that the modifying composition and the fluoropolymer are in contact and/or by varying the temperature of the process. The degree of surface modification may be determined by various well known surface analysis techniques including, but not limited to, Attenuated Total internal Reflectance Infrared Spectroscopy (ATR IR) and Electron Scattering for Chemical Analysis (ESCA), as well as contact angle measurements.

Once the fluoropolymer is modified, whether in the bulk phase, or at a surface of a solid fluoropolymer substrate (e.g., a film or block), it may be bonded to a second substrate. Such bonding may be accomplished, for example, using glue or adhesive (e.g., pressure-sensitive, thermosetting, hot melt) and/or by laminating under pressure and/or with heating using conventional methods, and resulting in a composite article as shown in the drawing, wherein composite article 100 comprises a fluoropolymer substrate 120 having a modified surface 160, which contacts optional adhesive layer 150 and surface 140 of second substrate 130.

Suitable heat sources for bonding include, for example, ovens, heated rollers, heated presses, infrared radiation sources, flame, and the like. Suitable pressure for bonding may be provided by, for example, presses, nip rollers, and the like. The necessary amounts of heat and pressure will depend on the specific materials to be bonded, and is typically easily determined by empirical methods.

The second substrate may comprise, for example, a polymer (e.g., as a film or block), metal, glass, or other material. If the second substrate is a polymer film such as a fluoropolymer or a non-fluorinated polymer, it may be the same as, or different from, the fluoropolymer substrate. The second substrate may have polar groups on its surface that aid in forming a strong adhesive bond. Polar groups may be introduced by known techniques including, for example, corona treatment.

Exemplary polymer films that may be used as a second substrate include films comprising thermoplastic polymers such as polyamides(e.g., nylon-6, nylon-6,6, nylon-11, and nylon-12), polyolefins (e.g., polyethylene, polypropylene), copolymers of olefins with ethylenically unsaturated monomers (e.g., ethylene vinyl acetate, anhydride modified polyethylene polymers, anhydride modified polypropylene polymers), polyethers, polyurethanes, polyesters, polyimides, polystyrene, polycarbonates, polyketones, polyureas, acrylics, and combinations thereof; elastomers such as acrylonitrile butadiene rubber, butadiene rubber, chlorinated or chlorosulfonated polyethylene, chloroprene, ethylene-propylene monomer rubber, ethylene-propylene-diene monomer rubber, epichlorohydrin rubber, polyisobutylene, polyisoprene, polyurethane, silicone rubber, styrene-butadiene rubber, ethylene-acrylate copolymer rubber, ethylene-vinyl acetate rubber, and combinations thereof; and combinations thereof.

The polymer film may comprise one or more additives such as, for example, fillers, plasticizers, antioxidants, or light stabilizers.

Objects and advantages of this invention are further illustrated by the following non-limiting examples, but the particular materials and amounts thereof recited in these examples, as well as other conditions and details, should not be construed to unduly limit this invention.

EXAMPLES

Unless otherwise noted, all reagents used in the examples were obtained, or are available, from general chemical suppliers such as Sigma-Aldrich Corporation, Saint Louis, Mo. or may be synthesized by conventional methods.

The following examples and tests were carried out under ambient conditions (21–25° C.) unless otherwise specified.

In the Examples:

"Me" means methyl; "Bu" means n-butyl; "Pentyl" means n-pentyl; "Hexyl" means n-hexyl; and "Octyl" means n-octyl;

"g" means grams, and "mL" means milliliters;

"NM" in the tables means "not measured";

"NA" in the Tables means "not applicable";

"FP1" refers to a 16–20 mils (0.41–0.51 mm) thick extruded film of a copolymer of 60.0 percent by weight of TFE, 18.0 percent by weight HFP, and 22.0 percent by weight of VDF, $T_m$=165° C.; prepared generally according to the procedure of U.S. Pat. No. 6,242,548 (Duchesne et al.).

"FP2" refers to a 16–20 mils (0.41–0.51 mm) thick extruded film of a copolymer of 73.0 percent by weight TFE, 11.5 percent by weight HFP, 11.5 percent by weight VDF, and 4.0 percent by weight of perfluoropropyl vinyl ether, $T_m$=222° C., MFI=4.8; prepared generally according to the procedure of U.S. Pat. No. 6,242,548 (Duchesne et al.);

"FP3" refers to a 16–20 mils (0.41–0.51 mm) thick film of polyvinylidene difluoride obtained by hot pressing PVDF resin obtained under the trade designation "SOLEF 1010" from Solvay, S. A., Brussels, Belgium under the trade designation "KYNAR 761";

"FP4" refers to a 16–20 mils (0.41–0.51 mm) thick extruded film of a copolymer of ethylene, TFE, and HFP obtained under the trade designation "DYNEON FLUOROTHERMOPLASTIC HTE" from Dyneon, LLC;

"FP5" refers to a 3 mils (0.08 mm) thick extruded film of polyvinyl fluoride obtained under the trade designation "TEDLAR" from E.I. du Pont de Nemours & Company;

"P1" refers to a 16–20 mils (0.41–0.51 mm) thick hot pressed film of nylon-12 having a Vicat softening point of 140° C. obtained under the trade designation "VESTAMID L2140", commercially available from Creanova (Somerset, N.J.);

"P2" refers to a 16–20 mils (0.41–0.51 mm) thick hot pressed film of an acid modified ethylene-vinyl acetate copolymer having the trade designation "BYNEL 3101" obtained from E.I. du Pont de Nemours and Co.;

"ADH1" refers to a bisphenol A epoxy resin obtained under the trade designation "EPON 828" from Resolution Performance Products, Houston, Tex.;

"ADH2" refers to a cycloaliphatic epoxy resin obtained under the trade designation "ERL 4221" from Dow Chemical Company, Midland, Mich.;

"ADH3" refers to a novolac epoxy resin obtained under the trade designation "DEN 431" from Dow Chemical Company;

"ADH4" refers to an ethylene acrylic acid resin obtained under the trade designation "THERMO-BOND FILM 406" from 3M Company;

"ADH5" refers to an ethylene acrylic acid resin obtained under the trade designation "THERMO-BOND FILM 557" from 3M Company;

"ADH6" refers to a polyester resin obtained under the trade designation "THERMO-BOND FILM 615" from 3M Company;

"ADH7" refers to a polyester resin obtained under the trade designation "THERMO-BOND FILM 668" from 3M Company;

"ADH8" refers to a polyolefin resin obtained under the trade designation "THERMO-BOND FILM 845" from 3M Company; and "ADH9" refers to an acrylic pressure-sensitive adhesive obtained under the trade designation "3M ADHESIVE TRANSFER TAPE 300" from 3M Company;

"PTC1" refers to methyltrialkyl($C_8$-$C_{10}$)ammonium chloride obtained under the trade designation "ADOGEN 464" from Sigma-Aldrich Corporation.

Preparation of Sodium Disulfide

Sodium disulfide used in the examples was prepared according to the following procedure: Into a flask was placed sodium sulfide nonahydrate crystal (24.0 g, 0.1 mole) and sulfur (3.2 g, 0.1 mole), the mixture was heated by a steam bath until the sulfur was completely dissolved. The reaction product was cooled to room temperature to give sodium disulfide as orange crystals.

ESCA Analysis

The instrument used in the analysis was a twin-analyzer ESCA apparatus with an un-monochromatized Al source; photoemission was detected at a scattering angle of 45 degrees with respect to the surface normal, unless otherwise specified.

T-Peel Test

Peel strength between the layers was measured in generally in accordance with D1876-01 (2001) "Standard Test Method for Peel Resistance of Adhesives (T-Peel Test)". Samples were cut into strips 25.4 mm wide by about 2 to 2.5 inches (5 to 6.3 cm) long.

A Model 1125 tester (available from Instron Corporation, Canton, Mass.) at 100 mm/minute crosshead speed was used as the test device. As the layers were separated, the average peel strength of the middle 80 percent of the sample was measured. The values from the first 10 percent and the last 10 percent distance of the crosshead travel were omitted. When the samples broke within the material without separating the layers at the bonding interface, the peak value was used instead of the average number. Reported peel strengths, calculated as the average load measured during each peel test and reported in Newtons/meter (N/m) of sample width, represent an average of at least two measurements obtained from identical samples.

REFERENCE EXAMPLE 1

Two glass thermometers (red alcohol, and mercury types), not transparent to 254 nanometer radiation, were placed for 10 minutes at a distance of 2 inches (5 centimeters) under a flat bank of six G15T8 germicidal bulbs (an ultraviolet radiation source with maximum intensity at a wavelength of 254 nanometers) spaced on 2 inch (5 cm) centers obtained from General Electric Company, Schenectady, N.Y. The temperature rose from an initial temperature of 23° C. and leveled off at a final temperature of 29° C.

COMPARATIVE EXAMPLE 1

$Bu_4PBr$ (1.0 g) and 3.0 g potassium hydroxide (KOH) were added to 60 ml water and stirred for 20 minutes at room temperature. A piece of FP1 (2.0 inches by 1.0 inch (5.1 cm by 2.5 cm)) was submerged in the solution for 5 minutes at 25° C. The treated fluoropolymer film was then removed, washed repeatedly in water (6×100 mL) by stirring the water with the film, washed twice with isopropanol and dried. The sample was then analyzed by ESCA to determine the chemical modifying composition of the treated surface. The results of the ESCA analysis are reported in Table 1.

COMPARATIVE EXAMPLE 2

The procedure of Comparative Example 1 was repeated, except that the temperature of the treatment solution was held at 80° C. for 5 minutes while in contact with the fluoropolymer film. The treated surface of the film was analyzed by ESCA, and the results are reported in Table 1.

The treated fluoropolymer film was placed in a screw cap vial containing 30 mL of 0.5 molar bromine in carbon tetrachloride and was held at 25° C. for 20 minutes. The film coupon was removed from the bromine solution, washed with carbon tetrachloride followed by dichloromethane, and dried. The treated surface of the film was analyzed by ESCA, and the results are shown in Table 1.

EXAMPLE 1

Bu₄PBr (1.0 g) and 3.0 g sodium sulfide (Na₂S) were added to 60 ml water and stirred for 20 minutes at room temperature. A film of fluoropolymer (FP1) was submerged in the solution for 5 minutes at 25° C. The treated fluoropolymer film was then removed and processed in the same manner as described in Comparative Example 1. The treated surface of the film was analyzed by ESCA, and the results are reported in Table 1.

EXAMPLE 2

The procedure of Example 1 was repeated, except that the temperature of the treatment solution was held at 80° C. for 5 minutes during contact with the fluoropolymer film. The treated surface of the film was analyzed by ESCA and the results are reported in Table 1.

The treated fluoropolymer film was brominated using the procedure of Comparative Example 2. The treated surface of the film was analyzed by ESCA, and the results are shown in Table 1.

COMPARATIVE EXAMPLE 3

Comparative Example 3 was an untreated piece of FP1 film (2.0 inches by 1.0 inch (5.1 cm by 2.5 cm)).

TABLE 1

| Example | ESCA Analysis | | | | | | |
|---|---|---|---|---|---|---|---|
| | % C | % O | % N | % F | % P | % S | % Br |
| Comparative Example 1 | 38 | 0 | 0 | 62 | 0 | 0 | 0 |
| Comparative Example 2 (unbrominated) | 53.7 | 7.9 | ≤1.2 | 37.1 | ≤0.7 | 0 | 0 |
| Comparative Example 2 (brominated) | 50.8 | 13.0 | ≤1.2 | 33 | ≤0.7 | 0 | 1.5 |
| Comparative Example 3 | 38 | 0 | 0 | 62 | 0 | 0 | 0 |
| Example 1 | 46 | 3.9 | ≤1.0 | 48 | 0 | 1.2 | 0 |
| Example 2 (unbrominated) | 60.9 | 12.8 | ≤1.0 | 20.5 | 0 | 3.8 | 0 |
| Example 2 (brominated) | 60.9 | 12.8 | 0 | 20.5 | 0 | 3.8 | 1.4 |

EXAMPLES 3–22 and COMPARATIVE EXAMPLES 4–7

Pieces (2.0 inches by 1.0 inch (5.1 cm by 2.5 cm)) of fluoropolymer film (i.e., FP1 or FP2) were treated according to the procedure of Example 1, except that the modifying composition, temperature, and duration of treatment were varied as reported in Table II.

The treated piece of fluoropolymer film was laminated to a piece (2.0 inches by 1.0 inch (5.1 cm by 2.5 cm)) of a second polymer film (i.e., P1 or P2) using the following general procedure: The fluoropolymer film was superimposed on the second polymer film, and a strip of polytetrafluoroethylene-coated fiber sheet was inserted about 0.6 cm along one short edge between the fluoropolymer film to be tested and the second polymer film to provide a non-bonded edge to aid in the T-Peel Test. The resultant superimposed film assembly was then laminated together by heating the sheets under 150 psi (1.03 MPa) pressure at 200° C. for 2 minutes between heated platens of a heated hydraulic press. The resultant hot laminated assembly was then immediately cooled by placing it in intimate contact with a water-cooled metal platen (13–15° C.). The sample was then gradually warmed to room temperature and the laminated assembly was tested according to the T-Peel Test.

TABLE 2

| Example | Modifying Composition, Component (amount) | Phase Transfer Catalyst (amount) | Temperature, ° C. | Duration, seconds | Fluoropolymer | T-Peel Test, N/m | |
|---|---|---|---|---|---|---|---|
| | | | | | | P1 | P2 |
| Comparative Example 4 | KOH (3 g), H₂O (60 mL) | Bu₄PBr (1 g) | 25 | 300 | FP1 | 650 | 35 |
| Comparative Example 5 | KOH (3 g), H₂O (60 mL) | Bu₄PBr (1 g) | 60 | 60 | FP1 | 3154 | 173 |
| Comparative Example 6 | KOH (3 g), H₂O (60 mL) | Pentyl₄NBr (1 g) | 25 | 120 | FP1 | 228 | 51 |
| Comparative Example 7 | KOH (3 g), H₂O (60 mL) | Pentyl₄NBr (1 g) | 60 | 30 | FP1 | NM | 244 |
| 3 | KOH (3 g), Na₂S (0.7 g), H₂O (60 mL) | Bu₄PBr (1 g) | 25 | 300 | FP1 | >3330 | 71 |
| 4 | KOH (3 g), Na₂S (0.7 g), H₂O (60 mL) | Bu₄PBr (1 g) | 60 | 60 | FP1 | >3330 | 752 |
| 5 | KOH (3 g), Na₂S (0.7 g), H₂O (60 mL) | Bu₄NCl (1 g) | 25 | 300 | FP1 | >3330 | 87 |

TABLE 2-continued

| Example | Modifying Composition, Component (amount) | Phase Transfer Catalyst (amount) | Temperature, °C. | Duration, seconds | Fluoropolymer | T-Peel Test, N/m P1 | P2 |
|---|---|---|---|---|---|---|---|
| 6 | KOH (3 g), Na$_2$S (0.7 g), H$_2$O (60 mL) | Bu$_4$NCl (1 g) | 60 | 60 | FP1 | >3330 | 524 |
| 7 | KOH (3 g), Na$_2$S (0.7 g), H$_2$O (60 mL) | Pentyl$_4$NCl (1 g) | 25 | 300 | FP1 | >3330 | 2100 |
| 8 | KOH (3 g), Na$_2$S (0.7 g), H$_2$O (60 mL) | Pentyl$_4$NCl (1 g) | 25 | 30 | FP1 | >3330 | NM |
| 9 | KOH (3 g), Na$_2$S (0.7 g), H$_2$O (60 mL) | Pentyl$_4$NCl (1 g) | 25 | 5 | FP1 | 1067 | NM |
| 10 | KOH (3 g), Na$_2$S (0.7 g), H$_2$O (60 mL) | Pentyl$_4$NCl (1 g) | 60 | 5 | FP1 | >3330 | 1260 |
| 11 | KOH (3 g), Na$_2$S (0.7 g), H$_2$O (60 mL) | Pentyl$_4$NCl (1 g) | 60 | 30 | FP1 | >3330 | 1490 |
| 12 | KOH (3 g), Na$_2$S (0.7 g), H$_2$O (60 mL) | Pentyl$_4$NCl (1 g) | 60 | 60 | FP2 | >3330 | 402 |
| 13 | KOH (3 g), Na$_2$S (0.7 g), H$_2$O (60 mL) | Hexyl$_4$NCl (1 g) | 60 | 60 | FP1 | >3330 | 2100 |
| 14 | KOH (3 g), Na$_2$S (0.7 g), H$_2$O (60 mL) | Hexyl$_4$NCl (1 g) | 60 | 60 | FP2 | >3330 | 1280 |
| 15 | KOH (3 g), Na$_2$S (0.7 g), H$_2$O (60 mL) | Hexyl$_4$NBr (1 g) | 60 | 60 | FP1 | >3330 | 2280 |
| 16 | KOH (3 g), Na$_2$S (0.7 g), H$_2$O (60 mL) | Hexyl$_4$NBr (1 g) | 60 | 60 | FP2 | >3330 | 1000 |
| 17 | KOH (3 g), Na$_2$S (0.7 g), H$_2$O (60 mL) | Octyl$_4$NF (1 g) | 60 | 60 | FP1 | >3330 | >3330 |
| 18 | KOH (3 g), Na$_2$S (0.7 g), H$_2$O (60 mL) | Octyl$_4$NF (1 g) | 60 | 60 | FP2 | 2976 | 1840 |
| 19 | KOH (3 g), Na$_2$S (0.7 g), H$_2$O (60 mL) | Me$_4$NOH (1 g) | 25 | 300 | FP1 | 701 | 35 |
| 20 | KOH (3 g), Na$_2$S (0.7 g), H$_2$O (60 mL) | Me$_4$NOH (1 g) | 60 | 60 | FP1 | 1260 | 35 |
| 21 | KOH (3 g), Na$_2$S (0.7 g), H$_2$O (60 mL) | Me$_4$NOH (1 g) | 25 | 300 | FP2 | 228 | 35 |
| 22 | KOH (3 g), Na$_2$S (0.7 g), H$_2$O (60 mL) | Me$_4$NOH (1 g) | 60 | 60 | FP2 | 173 | 35 |

EXAMPLES 23–28 and COMPARATIVE EXAMPLE 8

Samples of FP1 were exposed to various modifying solutions and phase transfer catalysts in amounts as reported in Table 3 according to the general procedure of Comparative Example 1, and then analyzed by ESCA. Results are reported in Table 3 (below).

TABLE 3

| EXAMPLE | Modifying Composition, Component (amount) | Phase Transfer Catalyst (amount) | ESCA Analysis, 15 degree scattering angle | | | | |
|---|---|---|---|---|---|---|---|
| | | | % C | % O | % N | % S | % F |
| Comparative Example 8 | KOH (12 g), H₂0 (60 mL) | none | 45 | 4.3 | 2.1 | 0 | 49 |
| 23 | Na₂S (4 g), H₂O (60 mL) | Me₄NOH, (1 g) | 47 | 5.7 | 2.4 | 0.9 | 44 |
| 24 | Na₂S (4 g), H₂O (60 mL) | Bu₄PBr (1 g) | 56 | 8.2 | 1.6 | 4.5 | 29 |
| 25 | Na₂S (4 g), H₂O (60 mL) | Pentyl₄NBr (1 g) | 60 | 9.2 | 2.3 | 6.2 | 22 |
| 26 | Na₂S (4 g), H₂O (60 mL) | Hexyl₄NBr (1 g) | 63 | 7.8 | 1.9 | 6.3 | 21 |
| 27 | Na₂S (4 g), H₂O (60 mL) | Octyl₄NF (1 g) | 62 | 6.6 | 1.7 | 4.5 | 25 |

EXAMPLES 28–45

Strips (7.6 cm×1.3 cm) of FP1 and FP2 were each modified by treating them with a modifying composition consisting of 3.0 g of KOH, 0.7 g of Na₂S, 1.0 g of Bu₄PBr, and 60 ml water (60° C., 120 seconds). Adhesion of surface-modified FP1 and FP2 films were measured using two strips of FP1 or two strips of FP2 that were bonded together with adhesive covering an area of 5.1 cm×1.3 cm placed between the two strips, as reported in Table 4. Bonding of Examples 28–36 (resulting in respective Examples 37–45) was achieved by heating the sample at 140° C. in a heated hydraulic press using a pressure of approximately 1 MPa. The bonded samples were tested according to the T-Peel Test using a crosshead speed of 5.08 cm/minute. Peel strength values of at least five samples were averaged and data was expressed in N/m.

TABLE 4

| | Treated | | T-Peel Test, N/m | |
|---|---|---|---|---|
| Example | Film | Adhesive | FP1 | FP2 |
| 37 | Example 28 | ADH1 | 2310 | 35 |
| 38 | Example 29 | ADH2 | 2540 | 1730 |
| 39 | Example 30 | ADH3 | NM | 193 |
| 40 | Example 31 | ADH4 | 1890 | 457 |
| 41 | Example 32 | ADH5 | 1400 | 193 |
| 42 | Example 33 | ADH6 | 1020 | 1070 |
| 43 | Example 34 | ADH7 | 2240 | 909 |
| 44 | Example 35 | ADH8 | 1070 | 209 |
| 45 | Example 36 | ADH9 | 736 | 173 |

EXAMPLES 46–70 and COMPARATIVE EXAMPLES 9 and 10

Examples 46–70 were conducted generally according to the procedure of Comparative Example 1, with procedural modifications and test results as reported in Table 5 (below).

TABLE 5

| Example | Modifying Composition, Component (amount) | Phase Transfer Catalyst (amount) | Temperature, °C. | Duration, seconds | Fluoropolymer | T-Peel Test, N/m | |
|---|---|---|---|---|---|---|---|
| | | | | | | P1 | P2 |
| 46 | KOH (1 g), Na₂S (4 g), H₂O (60 ml) | Bu₄PBr (1 g) | 80 | 10 | FP1 | NM | 2600 |
| 47 | KOH (1 g), Na₂S (4 g), H₂O (60 ml) | Bu₄PBr (1 g) | 80 | 30 | FP1 | NM | 2600 |
| 48 | KOH (4 g), Na₂S (1.4 g), H₂O (60 ml) | Bu₄PBr (1 g) | 80. | 10 | FP1 | NM | 2300 |
| 49 | KOH (4 g), Na₂S (1.4 g), H₂O (60 ml) | Bu₄PBr (1 g) | 80 | 30 | FP1 | NM | 2500 |
| 50 | KOH (4 g), Na₂S (1.4 g), H₂O (60 ml) | Bu₄PBr (1 g) | 80. | 60 | FP1 | NM | 2600 |
| 51 | KOH (3 g), Na₂S (0.7 g), H₂O (60 ml) | Bu₄PBr (1 g) | 80. | 10 | FP1 | NM | 2500 |

TABLE 5-continued

| Example | Modifying Composition, Component (amount) | Phase Transfer Catalyst (amount) | Temperature, ° C. | Duration, seconds | Fluoropolymer | T-Peel Test, N/m P1 | T-Peel Test, N/m P2 |
|---|---|---|---|---|---|---|---|
| 52 | KOH (3 g), Na$_2$S (0.7 g), H$_2$O (60 ml) | Bu$_4$PBr (1 g) | 80 | 5 | FP1 | NM | >2500 |
| 53 | KOH (2 g), Na$_2$S (3 g), HOCH$_2$CH$_2$OH (60 ml) | Bu$_4$PBr (1 g) | 80 | 30 | FP1 | NM | 880 |
| 54 | KOH (2 g), Na$_2$S (3 g), HOCH$_2$CH$_2$OH (60 ml) | Bu$_4$PBr (1 g) | 80 | 60 | FP1 | NM | 960 |
| 55 | KOH (2 g), Na$_2$S (4 g), H$_2$O (60 ml) | Bu$_4$PBr (1 g) | 60 | 60 | FP3 | >3500 | 1300 |
| 56 | Na$_2$S (2.1 g), H$_2$O (60 ml) | Bu$_4$PBr (1 g) | 60 | 30 | FP1 | >2800 | 700 |
| 57 | KOH (3 g), Na$_2$S (0.7 g), HOCH$_2$CH$_2$OH (30 ml) | PTC1 (1 g) | 60 | 120 | FP1 | NM | 3200 |
| 58 | KOH (3 g), Na$_2$S (0.7 g), H$_2$O (60 ml) | PTC1 (0.2) | 60 | 60 | FP1 | NM | 3200 |
| 59 | KOH (3 g), Na$_2$S (0.7 g), H$_2$O (60 ml) | PTC1 (0.2) | 60 | 60 | FP2 | NM | >2500 |
| 60 | KOH (3 g), Na$_2$S (0.7 g), H$_2$O (60 ml) | PTC1 (0.1) | 60 | 60 | FP1 | NM | 2452 |
| Comparative Example 9 | KOH (3 g), H$_2$O (60 ml) | Bu$_4$PBr (1 g) | 60 | 120 | FP3 | NM | 100 |
| 61 | KOH (3 g), Na$_2$S (0.7 g), H$_2$O (60 ml) | Bu$_4$PBr (1 g) | 60 | 120 | FP3 | NM | 440 |
| 62 | KOH (3 g), Na$_2$S (0.7 g), H$_2$O (60 ml) | 18-crown-6 ether (1 g) | 60 | 120 | FP1 | NM | 440 |
| 63 | KOH (3 g), Na$_2$S$_2$ (0.8 g), H$_2$O (60 ml) | Bu$_4$PBr (1 g) | 60 | 120 | FP1 | 960 | 840 |
| 64 | KOH (3 g), Na$_2$S$_2$ (2 g), H$_2$O (60 ml) | Bu$_4$PBr (1 g) | 60 | 120 | FP1 | 1300 | 860 |
| 65 | KOH (3 g), Na$_2$S (0.7 g), H$_2$O (60 ml) | Bu$_4$PBr (1 g) | 60 | 120 | FP4 | 400 | 20 |
| 66 | KOH (3 g), Na$_2$S (0.7 g), H$_2$O (60 ml) | Pentyl$_4$NCl (1 g) | 60 | 300 | FP4 | 460 | 40 |
| Comparative Example 10 | none | none | NA | NA | FP5 | NM | 0.4 |
| 67 | KOH (3 g), Na$_2$S (2 g), H$_2$O (60 ml) | Bu4PBr | 60 | 180 | FP5 | NM | 3.2 |

EXAMPLES 68–71

Examples 68–71 were conducted generally according to the procedure of Comparative Example 1, with procedural modifications and test results as reported in Table 6 (below).

TABLE 6

| Example | Modifying Solution (amount) | Phase Transfer Catalyst (amount) | Temperature, °C. | Time, seconds | Fluoro-Polymer | T-Peel Strength, N/m | |
|---|---|---|---|---|---|---|---|
| | | | | | | P1 | P2 |
| 68 | KOH (3 g), $H_2O$ (60 ml) | $Bu_4PBr$ (1 g) | 40 | 120 | FP1 | 880 | 100 |
| 69 | KOH (3 g), $H_2O$ (60 ml) | $Bu_4PBr$ (1 g) | 40 | 300 | FP1 | 1300 | 440 |
| 70 | KOH (3 g), $Na_2S$ (0.7 g), $H_2O$ (60 ml) | $Bu_4PBr$ (1 g) | 40 | 120 | FP1 | 1300 | 950 |
| 71 | KOH (3 g), $Na_2S$ (0.7 g), $H_2O$ (60 ml) | $Bu_4PBr$ (1 g) | 40 | 300 | FP1 | 1400 | 1100 |

Various unforeseeable modifications and alterations of this invention may be made by those skilled in the art without departing from the scope and spirit of this invention, and it should be understood that this invention is not to be unduly limited to the illustrative embodiments set forth herein.

What is claimed is:

1. A method of preparing a composite article comprising: providing a first substrate having a surface comprising fluoropolymer;
   contacting the surface of the first substrate with a modifying composition comprising a phase transfer catalyst, a liquid vehicle, and at least one of a sulfide or polysulfide salt or an anionic conjugate acid of a sulfide or polysulfide, wherein the fluoropolymer has a backbone comprising subunits having the structure —$CH_2CFX$—, wherein X represents H, Cl, or F; and
   bonding the first substrate to a second substrate to provide a composite article, wherein the method is carried out in the substantial absence of actinic radiation.
2. A method according to claim 1, wherein the fluoropolymer backbone further comprises at least one of subunits having the structure —$CF_2CF_2$— or subunits having the structure —$CF_2CF(CF_3)$—.
3. A method according to claim 1, wherein the fluoropolymer backbone further comprises subunits having the structure —$CF_2CF_2$— and subunits having the structure —$CF_2CF(CF_3)$—.
4. A method according to claim 1, wherein the subunits are monomeric units.
5. A method according to claim 1, wherein the fluoropolymer is prepared from monomers comprising vinylidene difluoride.
6. A method according to claim 5, wherein the monomers further comprise at least one of tetrafluoroethylene or hexafluoropropylene.
7. A method according to claim 5, wherein the monomers further comprise tetrafluoroethylene and hexafluoropropylene.
8. A method according to claim 1, wherein X is H.
9. A method according to claim 1, wherein X is F.
10. A method according to claim 9, wherein the fluoropolymer backbone further comprises at least one of subunits having the structure —$CF_2CF_2$— or subunits having the structure —$CF_2CF(CF_3)$—.
11. A method according to claim 9, wherein the fluoropolymer backbone further comprises subunits having the structure —$CF_2CF_2$— and subunits having the structure —$CF_2CF(CF_3)$—.
12. A method according to claim 11, wherein the subunits are monomeric units.
13. A method according to claim 11, wherein the fluoropolymer is prepared from monomers comprising vinylidene difluoride.
14. A method according to claim 13, wherein the monomers further comprise at least one of tetrafluoroethylene or hexafluoropropylene.
15. A method according to claim 13, wherein the monomers further comprise tetrafluoroethylene and hexafluoropropylene.
16. A method according to claim 1, wherein bonding comprises adhesive bonding.
17. A method according to claim 1, wherein bonding comprises heat laminating.
18. A method according to claim 1, wherein the first substrate comprises a film.
19. A method according to claim 1, wherein at least one of the first or second substrates comprises at least one thermoplastic polymer.
20. A method according to claim 19, wherein at least one thermoplastic polymer comprises polyamide.
21. A method according to claim 1, wherein the phase transfer catalyst comprises a tetraalkylphosphonium or tetraalkylammonium salt having at least 16 carbon atoms.
22. A method according to claim 1, wherein the phase transfer catalyst comprises a tetraalkylphosphonium or tetraalkylammonium salt having at least 20 carbon atoms.
23. A method according to claim 1, wherein the phase transfer catalyst comprises a tetraalkylphosphonium or tetraalkylammonium salt having at least 24 carbon atoms.
24. A method according to claim 1, wherein the liquid vehicle comprises water.

* * * * *